March 7, 1950          F. C. GOOD          2,499,490
UNIVERSAL JOINT
Filed April 15, 1944          2 Sheets—Sheet 1
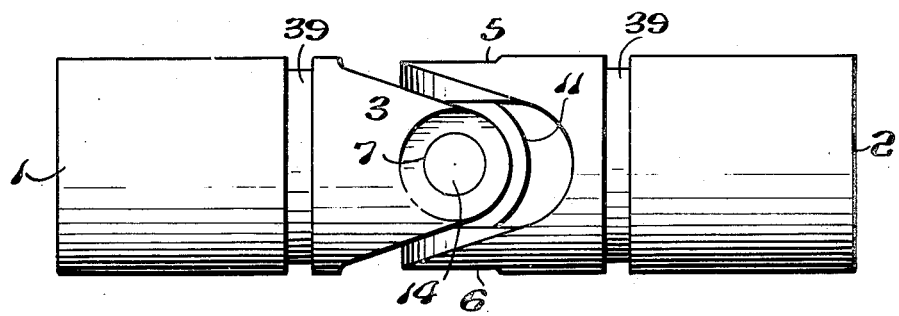
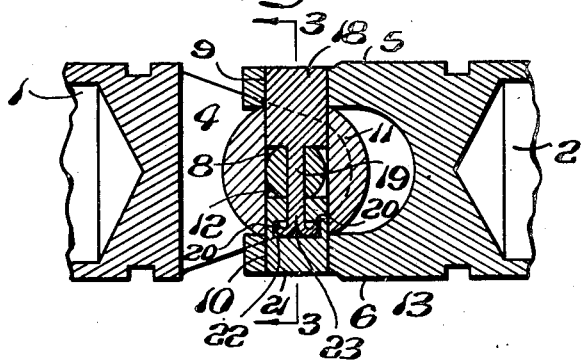 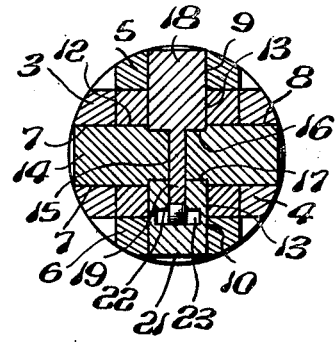
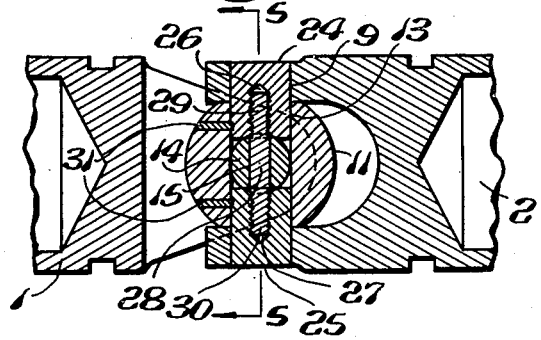 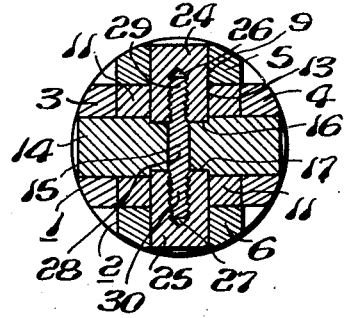
INVENTOR.
FREDERICK C. GOOD
BY
ATTY.

March 7, 1950        F. C. GOOD        2,499,490
UNIVERSAL JOINT
Filed April 15, 1944        2 Sheets-Sheet 2
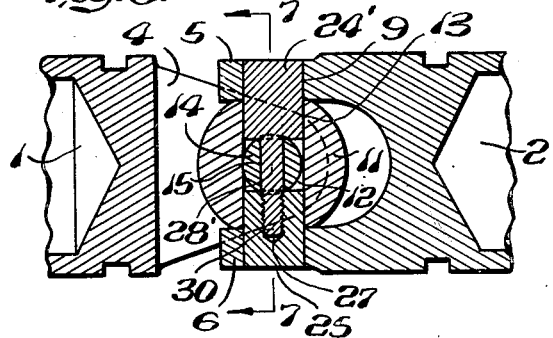
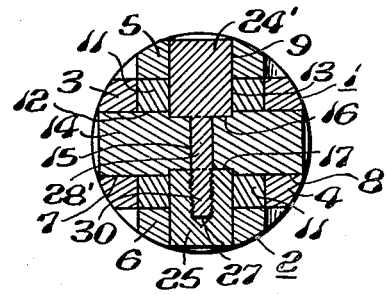
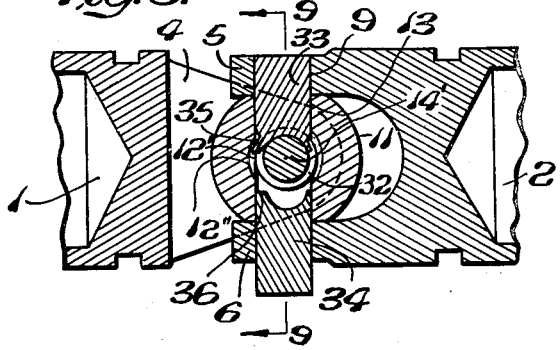
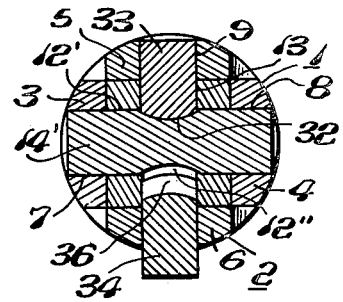
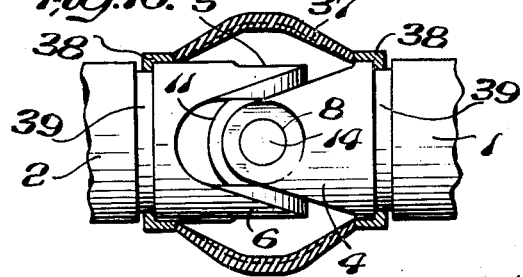
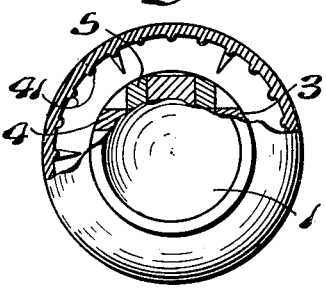
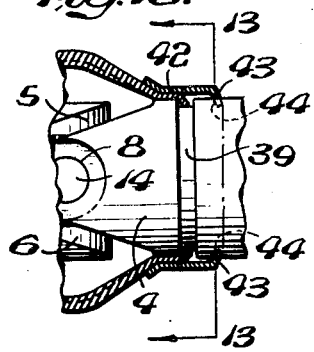
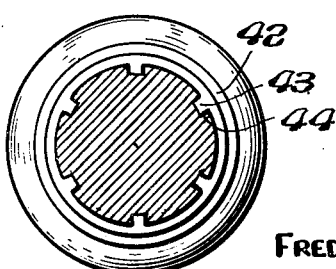
INVENTOR.
FREDERICK C. GOOD
BY
ATTY.

Patented Mar. 7, 1950

2,499,490

UNITED STATES PATENT OFFICE 2,499,490

UNIVERSAL JOINT

Frederick Charles Good, Cheltenham, Pa.

Application April 15, 1944, Serial No. 531,176

3 Claims. (Cl. 64—17)

My invention is an improved universal joint of the Hooke type in which forked members having integral cheeks are connected with a coupling block by smooth-surfaced pintles locked in the block and having cylindrical projecting sections forming complementary pairs of smooth-surfaced trunnions of solid cross section and substantially uniform diameter on which the cheeks of the respective forks are journalled.

By my improvements there is provided a universal joint of great ruggedness and uniform strength whose parts can be manufactured economically on standard machines and which can be quickly and easily assembled.

The solid cross section and uniformity of diameter of all the trunnions provides maximum and uniform strength at the points likely to be subjected to the greatest stresses and prevents distortion of the contour of the trunnion bearing surfaces peripherally or axially; hence the forks cannot bind on or be sprung off the pintles. The smooth-surfacing of the peripheries of the pintles simplifies the manufacture thereof; avoids the weakening of pintles commonly incident to threading their external surfaces; prevents rotary stresses on the pintles from imparting an axial movement thereto; promotes freedom of action of the joint, and facilitates the exclusion of moisture from the pintle-locking devices within the block.

My improved joint is preferably enclosed in a flexible, self-restoring housing having its ends secured to the hubs of the forked members by rings having spring prongs engaging the surfaces thereof.

The characteristic features and advantages of my improvements will further appear from the following description and the accompanying drawings of various illustrative embodiments thereof:

In the drawings, Fig. 1 is a side elevation of a universal joint embodying my invention; Fig. 2 is a longitudinal vertical sectional view of the universal joint shown in Fig. 1; Fig. 3 is a transverse sectional view on the line 3—3 of Fig. 2; Fig. 4 is a longitudinal sectional view of a universal joint similar to that shown in Fig. 1 but with a modified fastening for the inner ends of one of the pairs of trunnions; Fig. 5 is a transverse sectional view taken on the line 5—5 of Fig. 4; Fig. 6 is a longitudinal sectional view of a joint similar to that shown in Fig. 4 with a further modification of the trunnion fastenings; Fig. 7 is a transverse sectional view taken on the line 7—7 of Fig. 6; Fig. 8 is a longitudinal sectional view of a universal joint similar to that shown in Fig. 1 with a further modification of the trunnion securing means; Fig. 9 is a transverse sectional view taken on the line 9—9 of Fig. 8; Fig. 10 is a top plan view of the universal joint shown in Fig. 1 with a flexible hood thereon; Fig. 11 is a partly sectioned end view of the joint and hood shown in Fig. 10; Fig. 12 is a fragmentary side elevation partly in section of the hooded joint shown in Fig. 10 with a hood-retaining ring thereon; and Fig. 13 is a transverse sectional view taken on the line 13—13 of Fig. 12.

As illustrated in the drawings, my improvements are embodied in a universal joint of the Hooke type comprising a pair of socketed hubs 1 and 2 with bifurcated ends forming forked members or clevises having the respective pairs of rigid cheek members 3, 4 and 5, 6 integrally formed on the hubs. The cheeks 3 and 4 contain complementary, aligned, smooth-surfaced, cylindrical bores 7 and 8 (Fig. 3) forming bearing seats for trunnions. The cheeks 5 and 6 contain aligned, cylindrical, smooth surfaced bores 9 and 10 also forming bearing seats for trunnions.

A hexagonal coupling block 11, having two pairs of opposite parallel faces and one pair of opposite convexed faces, contains two cylindrical, smooth surfaced, through bores 12 and 13 at right angles to and axially intersecting one another. The bores 7, 8, 9, 10, 12 and 13 are all substantially the same in diameter. The coupling block 11 is positioned between the cheeks or jaws 3, 4, 5 and 6 with the bore 12 in alignment with the bores 7, 8 and with the bore 13 in alignment with the bores 9, 10.

As illustrated in Figs. 1 to 7, a pin 14, having a diametral bore 15 terminating in countersinks 16 and 17, is inserted in the aligned bores 7, 12 and 8 with the axis of the aperture 15 in alignment with the axis of the bore 13. The ends of the pin 14 project from the block 11 and form smooth-surfaced trunnions of solid cross-section journalled in the seats formed by the smooth-surfaced bores 7 and 8.

As shown in Figs. 1 to 3, a cylindrical, smooth-surfaced pin 18 is seated in the bores 9 and 13 and rests in the countersink 16. The outer portion of the pin 18 which projects from the block 11 forms a smooth-surfaced trunnion of solid cross section journalled in the seat formed by the bore 9. The inner end of the pin 18 has projecting therefrom, and through the aperture 15, a stem 19 having a bifurcated end 20.

A cylindrical, smooth-surfaced pin 21 is inserted in the bores 10 and 13 and rests in the countersink 17. The outer portion of the pin 21 which projects from the block 11 forms a smooth-surfaced trunnion of solid cross-section, which is journalled in the bore 10. The pin 21 contains a socket 22 closed at its outer end and preferably terminating in an enlargement 23. The pin 21 is forced onto the bifurcated end of the stem 15 so as to spread the bifurcations thereof into the recess 23 and rivet the pins 18 and 21 together. The depth of the socket 22 is so proportioned to the length of the stem 15 that the bifurcated ends of the latter are fully spread when the pins 18 and 21 are seated in the countersinks 16 and 17, and in such positions, the outer ends of the pins 18 and 21 form smooth-surfaced trunnions of solid cross section journalled in the seats formed by the bores 9 and 10 and having outer ends flush with the outer surfaces of the cheeks.

In the embodiment of my invention illustrated in Figs. 4 and 5, the forked hub 1 is secured to the coupling block 11 by the pin 14, as hereinbefore described, and the forked member 2 is secured to the coupling block 11 by cylindrical, smooth-surfaced pins 24 and 25 each containing an internally threaded socket 26, 27 and having closed outer ends forming smooth-surfaced trunnions of solid cross-section journalled in the cheeks 5 and 6. A stem or pin 28, seated in the aperture 15 of the pin 14, has threaded ends 29 and 30 onto which the internally threaded pins 24 and 25 may be screwed. The pins 24 and 25 may both be screwed onto the ends 29 and 30 after the pin 28 is positioned in the aperture 15, but preferably one of the socketed pins, say, 24, is threaded onto an end 29 of the pin 28 before the latter is inserted in the aperture 15, and the other socketed pin, say, 25, is then screwed onto the free end 30 of the pin 28 until the pins 24 and 25 are seated in the countersinks 16 and 17. The end surfaces of the pins 24 and 25 may then be ground off flush with the surface of the cheeks 5 and 6 to remove any tool slot or socket used in tightening the pins in place. Dowels 31 may be driven through apertures in the member 11 into notches in the pins 24 and 27 to prevent the unscrewing of the latter.

In the embodiment of my invention illustrated in Figs. 6 and 7, the forked member 1 is connected with the coupling block 11 by means of the pin 14 as previously described, and the forked member 2 is connected with the coupling block 11 by means of an internally threaded pin 25 and a pin 24' having an integral stem 28' threaded along the section 30 thereof for engagement in the threaded socket of the pin 25. The portions of the pins 24' and 25 which project from the block 11 form smooth-surfaced trunnions of solid cross-section journalled in the bores 9 and 10 of the cheeks 5 and 6.

In the embodiment of my invention illustrated in Figs. 8 and 9, the bore 12' in the coupling block 11 has an enlarged central section forming a channel 12'' in the middle of the block 11, such channel being intersected by the bore 13. The pin 14', which is seated in the bores 7, 12' and 8 to connect the forked hub 1 with the coupling block 11, has a peripheral concave channel or recess 32 registering with the channel 12'' in the block 11.

The forked hub 2 is pivotally connected with the coupling block 11 by a pair of cylindrical, smooth surfaced pins 33 and 34 fitting in the bores 9, 13 and 10. The end of each pin 33 and 34 contains an eccentric concavity forming deflectable ears 35 and 36 whose inner edges are convexed in a direction axially of the pin 14', as shown in Fig. 9. The curvature of the concave grooves in the inner ends of the pins 33 and 34 are drawn on radii shorter than the radii of the pin 14 at the channel 32 so that when the pins 33 and 34 are forced in against the pin 14 the ears 35 and 36 are deflected outward into the channel 12'' and the withdrawals of the pins 33 and 34 are thereby prevented. The nesting of the convex edges of the pins 33 and 34 in the channel 32 of the pin 14' prevent the longitudinal displacement of the latter. The ends of all the pins projecting from the block 11 form smooth-surfaced trunnions of solid cross-section journalled in the bearings of the respective forks.

Preferably, and as illustrated in Figs. 10 to 13 inclusive, a universal joint constructed as shown in Figs. 1 to 9 has its bifurcated members enclosed in a housing comprising a hood 37 of molded material, such as rubber, and having a concavo-convex contour axially thereof and terminating in cylindrical ends 38 having inturned flanges seated in grooves 39 of the hubs 1 and 2. The inner surface of the concavo-convex central section of the hood is provided with peripherally spaced, inwardly projecting ribs 41 which reinforce the hood and tend to restore it to normal position after flexure. The ends of the hood may be secured in the grooves 39 by the peripheral retaining rings 42 having peripherally spaced spring prongs 43 which tightly grip the surface of the hubs 1 and 2 or snap into notches 44 formed therein.

Having described my invention, I claim:

1. A universal joint comprising a pair of forked members, a coupling block, and means for pivotally connecting said members and block and comprising pins locked in said block and having parts projecting therefrom forming two pairs of trunnions journalled in said members, one of said pins having in its inner end a socket having a closed outer end and another of said pins having a projecting member locked in said socket.

2. A universal joint comprising a pair of forked members each having integral cheeks containing aligned bores, a coupling block containing through bores at right angles to one another, a pin seated in one of said last named bores and having projecting parts forming trunnions journalled in the bores of one of said forked members, a pair of pins seated in the other bore of said coupling block and having projecting parts forming trunnions journalled in the bores of the other of said forked members, one of said last named pins having in its inner end a threaded socket having a closed outer end and the other of said last named pins having a projection threaded in said socket.

3. A universal joint comprising a pair of forked members, a coupling block, and means pivotally connecting said members and block and comprising one continuous pin and a pair of pins extending transversely thereto; one of said pair of pins having an integral stem projecting through said continuous pin and connected with the other of said pair of pins by an integral projection of said stem, and said pins forming two pairs of smooth surfaced trunnions projecting from said block and journalled in said members.

FREDERICK CHARLES GOOD.

(References on following page)

REFERENCES CITED

The following references are of record in the file of this patent:

UNITED STATES PATENTS

| Number | Name | Date |
|---|---|---|
| 1,020,476 | Borcorselski | Mar. 19, 1912 |
| 1,371,750 | Fox | Mar. 15, 1921 |
| 1,411,069 | Thiemer | Mar. 28, 1922 |
| 1,638,400 | Kinsler | Aug. 9, 1927 |
| 1,926,858 | Peters | Sept. 12, 1933 |
| 2,040,002 | Jones | May 5, 1936 |
| 2,264,727 | Stillwagon | Dec. 2, 1941 |
| 2,264,728 | Stillwagon et al. | Dec. 2, 1941 |

FOREIGN PATENTS

| Number | Country | Date |
|---|---|---|
| 445,673 | Great Britain | Apr. 16, 1936 |